US006849704B2

(12) United States Patent
Lai et al.

(10) Patent No.: US 6,849,704 B2
(45) Date of Patent: Feb. 1, 2005

(54) ELASTIC SUBSTANTIALLY LINEAR OLEFIN POLYMERS

(75) Inventors: Shih-Yaw Lai, Sugar Land, TX (US); George W. Knight, Lake Jackson, TX (US); John R. Wilson, Richwood, TX (US); James C. Stevens, Midland, MI (US); Pak-Wing Steve Chum, Lake Jackson, TX (US)

(73) Assignee: Dow Global Technologies Inc., Midland, MI (US)

( * ) Notice: Subject to any disclaimer, the term of this patent is extended or adjusted under 35 U.S.C. 154(b) by 23 days.

(21) Appl. No.: 10/727,970

(22) Filed: Dec. 4, 2003

(65) Prior Publication Data

US 2004/0082741 A1 Apr. 29, 2004

Related U.S. Application Data

(60) Continuation of application No. 10/270,212, filed on Oct. 11, 2002, now Pat. No. 6,737,484, which is a continuation of application No. 09/884,261, filed on Jun. 19, 2001, now Pat. No. 6,548,611, which is a continuation of application No. 08/925,827, filed on Sep. 5, 1997, now abandoned, which is a continuation of application No. 08/730,766, filed on Oct. 16, 1996, now Pat. No. 5,665,800, which is a continuation of application No. 08/606,633, filed on Feb. 26, 1996, now abandoned, which is a continuation of application No. 08/433,784, filed on May 3, 1995, now abandoned, which is a division of application No. 08/370,051, filed on Jan. 9, 1995, now Pat. No. 5,525,695, which is a division of application No. 08/044,426, filed on Apr. 7, 1993, now Pat. No. 5,380,810, which is a division of application No. 07/776,130, filed on Oct. 15, 1991, now Pat. No. 5,272,236.

(51) Int. Cl.$^7$ .................. C08F 110/02; C08F 110/06
(52) U.S. Cl. .................. 526/348; 526/351; 526/352
(58) Field of Search .................. 526/348, 351, 526/352, 134, 160, 161, 172

(56) References Cited

U.S. PATENT DOCUMENTS

| | | |
|---|---|---|
| 3,491,073 A | 1/1970 | Marinak |
| 3,645,992 A | 2/1972 | Elston |
| 4,011,384 A | 3/1977 | Baxmann et al. |
| 4,205,021 A | 5/1980 | Morita et al. |
| 4,259,468 A | 3/1981 | Kajiura et al. |
| 4,302,566 A | 11/1981 | Karol et al. |
| 4,303,710 A | 12/1981 | Bullard et al. |
| 4,303,771 A | 12/1981 | Wagner et al. |
| 4,328,328 A | 5/1982 | Minami et al. |
| 4,339,493 A | 7/1982 | Weiner |
| 4,339,496 A | 7/1982 | Weiner |
| 4,340,640 A | 7/1982 | Weiner |
| 4,340,641 A | 7/1982 | Weiner |
| 4,346,834 A | 8/1982 | Mazumdar |
| 4,349,648 A | 9/1982 | Jorgensen et al. |
| 4,354,009 A | 10/1982 | Goeke et al. |
| 4,359,561 A | 11/1982 | Fraser et al. |
| 4,363,904 A | 12/1982 | Fraser et al. |
| 4,367,256 A | 1/1983 | Biel |
| 4,370,456 A | 1/1983 | George |
| 4,379,197 A | 4/1983 | Cipriani et al. |
| 4,380,567 A | 4/1983 | Shigemoto |
| 4,383,095 A | 5/1983 | Goeke et al. |
| 4,390,677 A | 6/1983 | Karol et al. |
| 4,399,180 A | 8/1983 | Briggs et al. |
| 4,405,774 A | 9/1983 | Miwa et al. |
| 4,410,649 A | 10/1983 | Cieloszyk |
| 4,418,114 A | 11/1983 | Briggs et al. |
| 4,424,138 A | 1/1984 | Candlin et al. |
| 4,427,573 A | 1/1984 | Miles et al. |
| 4,438,243 A | 3/1984 | Kashiwa et al. |
| 4,452,958 A | 6/1984 | Chester et al. |
| 4,454,281 A | 6/1984 | Heitz et al. |
| 4,461,792 A | 7/1984 | Anthony |
| 4,463,153 A | 7/1984 | Mizutani et al. |
| 4,464,426 A | 8/1984 | Anthony |
| 4,467,065 A | 8/1984 | Williams et al. |
| 4,474,740 A | 10/1984 | Karwat et al. |
| 4,482,687 A | 11/1984 | Noshay et al. |
| 4,485,217 A | 11/1984 | Gunter et al. |
| 4,486,579 A | 12/1984 | Machon et al. |
| 4,505,970 A | 3/1985 | Craver |
| 4,510,303 A | 4/1985 | Oda et al. |
| 4,513,038 A | 4/1985 | Anthony |
| 4,514,465 A | 4/1985 | Schoenberg |
| 4,519,968 A | 5/1985 | Michel et al. |
| 4,530,914 A | 7/1985 | Ewen et al. |

(List continued on next page.)

FOREIGN PATENT DOCUMENTS

| | | |
|---|---|---|
| EP | 0416815 A2 | 3/1991 |
| WO | 9003414 | 4/1990 |

OTHER PUBLICATIONS

*Journal of Polymer Science*, Part A, vol. 1 (pp. 2869–2880 (1963)), "Long–Chain Branching Frequency in Polyethylene" by J. E. Guillet.

(List continued on next page.)

*Primary Examiner*—Roberto Rabago
(74) *Attorney, Agent, or Firm*—Whyte Hirschboeck Dudek SC (57) ABSTRACT

Substantially linear olefin polymers having a melt flow ratio, $I_{10}/I_2, \geq 5.63$, a molecular weight distribution, $M_w/M_n$, defined by the equation: $M_w/M_n \leq (I_{10}/I_2) - 4.63$, and a critical shear stress at onset of gross melt fracture of greater than about $4 \times 10^6$ dyne/cm$^2$ and their method of manufacture are disclosed. The substantially linear olefin polymers preferably have at least about 0.01 long chain branches/1000 carbons and a molecular weight distribution from about 1.5 to about 2.5. The new polymers have improved processability over conventional olefin polymers and are useful in producing fabricated articles such as fibers, films, and molded parts.

3 Claims, 5 Drawing Sheets

U.S. PATENT DOCUMENTS

| | | |
|---|---|---|
| 4,532,189 A | 7/1985 | Mueller |
| 4,547,555 A | 10/1985 | Cook et al. |
| 4,551,380 A | 11/1985 | Schoenberg |
| 4,563,504 A | 1/1986 | Hert et al. |
| 4,564,559 A | 1/1986 | Wagner et al. |
| 4,568,713 A | 2/1986 | Hansen et al. |
| 4,587,318 A | 5/1986 | Inoue et al. |
| 4,588,650 A | 5/1986 | Mientus et al. |
| 4,588,794 A | 5/1986 | Oda |
| 4,593,009 A | 6/1986 | Nowlin |
| 4,597,920 A | 7/1986 | Golike |
| 4,598,128 A | 7/1986 | Randall et al. |
| 4,599,391 A | 7/1986 | Yamamoto et al. |
| 4,613,547 A | 9/1986 | Wagner et al. |
| 4,617,241 A | 10/1986 | Mueller |
| 4,618,662 A | 10/1986 | Nowlin |
| 4,624,991 A | 11/1986 | Haas |
| 4,626,467 A | 12/1986 | Hostetter |
| 4,629,771 A | 12/1986 | Candlin et al. |
| 4,649,001 A | 3/1987 | Nakamura et al. |
| 4,666,772 A | 5/1987 | Schinkel et al. |
| 4,666,999 A | 5/1987 | Cook et al. |
| 4,668,575 A | 5/1987 | Schinkel et al. |
| 4,668,650 A | 5/1987 | Lo et al. |
| 4,668,752 A | 5/1987 | Tominari et al. |
| 4,672,096 A | 6/1987 | Nowlin |
| 4,676,922 A | 6/1987 | Sommer |
| 4,677,087 A | 6/1987 | Lo et al. |
| 4,690,991 A | 9/1987 | Seppala |
| 4,690,992 A | 9/1987 | Grubbs et al. |
| 4,692,386 A | 9/1987 | Schinkel et al. |
| 4,710,538 A | 12/1987 | Jorgensen |
| 4,716,207 A | 12/1987 | Cozewith et al. |
| 4,719,193 A | 1/1988 | Levine et al. |
| 4,720,427 A | 1/1988 | Clauson et al. |
| 4,722,971 A | 2/1988 | Datta et al. |
| 4,732,882 A | 3/1988 | Allen et al. |
| 4,742,138 A | 5/1988 | Kageyama |
| 4,762,898 A | 8/1988 | Matsuura et al. |
| 4,764,549 A | 8/1988 | Greenhalgh et al. |
| 4,775,710 A | 10/1988 | Dunski et al. |
| 4,780,264 A | 10/1988 | Dohrer et al. |
| 4,788,232 A | 11/1988 | Needham |
| 4,789,714 A | 12/1988 | Cozewith et al. |
| 4,792,595 A | 12/1988 | Cozewith et al. |
| 4,803,253 A | 2/1989 | McDaniel et al. |
| 4,808,635 A | 2/1989 | Nguyen |
| 4,820,589 A | 4/1989 | Dobreski et al. |
| 4,824,889 A | 4/1989 | Mostert |
| 4,826,939 A | 5/1989 | Stuart |
| 4,830,926 A | 5/1989 | Mostert |
| 4,833,017 A | 5/1989 | Benoit |
| 4,834,947 A | 5/1989 | Cook et al. |
| 4,842,187 A | 6/1989 | Janocha et al. |
| 4,842,930 A | 6/1989 | Schinkel et al. |
| 4,842,951 A | 6/1989 | Yamada et al. |
| 4,857,611 A | 8/1989 | Durand et al. |
| 4,874,820 A | 10/1989 | Cozewith et al. |
| 4,876,321 A | 10/1989 | Lo et al. |
| 4,882,406 A | 11/1989 | Cozewith et al. |
| 4,883,853 A | 11/1989 | Hobes et al. |
| 4,888,318 A | 12/1989 | Allen et al. |
| 4,892,911 A | 1/1990 | Genske |
| 4,921,920 A | 5/1990 | Collomb-Ceccarini et al. |
| 4,923,750 A | 5/1990 | Jones |
| 4,925,728 A | 5/1990 | Crass et al. |
| 4,935,474 A | 6/1990 | Ewen et al. |
| 4,937,299 A | 6/1990 | Ewen et al. |
| 4,959,436 A | 9/1990 | Cozewith et al. |
| 4,963,388 A | 10/1990 | Benoit |
| 4,966,951 A | 10/1990 | Benham et al. |
| 4,967,898 A | 11/1990 | Muller et al. |
| 4,968,765 A | 11/1990 | Yagi et al. |
| 4,975,315 A | 12/1990 | Bothe et al. |
| 4,981,826 A | 1/1991 | Speca |
| 4,983,447 A | 1/1991 | Crass et al. |
| 4,987,212 A | 1/1991 | Morterol et al. |
| 4,996,094 A | 2/1991 | Dutt |
| 5,006,396 A | 4/1991 | VanBortel et al. |
| 5,013,801 A | 5/1991 | Cozewith et al. |
| 5,015,511 A | 5/1991 | Treybig et al. |
| 5,019,315 A | 5/1991 | Wilson |
| 5,024,799 A | 6/1991 | Harp et al. |
| 5,025,072 A | 6/1991 | Nowlin et al. |
| 5,026,798 A | 6/1991 | Canich |
| 5,041,316 A | 8/1991 | Parnell et al. |
| 5,043,040 A | 8/1991 | Butler |
| RE33,683 E | 9/1991 | Allen et al. |
| 5,047,468 A | 9/1991 | Lee et al. |
| 5,055,338 A | 10/1991 | Sheth et al. |
| 5,055,438 A | 10/1991 | Canich |
| 5,055,533 A | 10/1991 | Allen et al. |
| 5,055,534 A | 10/1991 | Theobald |
| 5,059,481 A | 10/1991 | Lustig et al. |
| 5,064,796 A | 11/1991 | Speca |
| 5,068,489 A | 11/1991 | Edwards et al. |
| 5,073,452 A | 12/1991 | Satou et al. |
| 5,073,599 A | 12/1991 | Genske |
| 5,082,908 A | 1/1992 | Imai et al. |
| 5,084,039 A | 1/1992 | Cancio et al. |
| 5,084,540 A | 1/1992 | Albizzati et al. |
| 5,084,927 A | 2/1992 | Parkevich |
| 5,096,867 A * | 3/1992 | Canich .................. 502/103 |
| 5,336,746 A * | 8/1994 | Tsutsui et al. ........... 526/348.6 |
| 5,380,810 A * | 1/1995 | Lai et al. ................ 526/352 |
| 5,525,695 A * | 6/1996 | Lai et al. ................ 526/352 |
| 5,665,800 A | 9/1997 | Lai et al. ................ 524/115 |
| 5,783,638 A * | 7/1998 | Lai et al. ................ 525/240 |
| 5,986,028 A | 11/1999 | Lai et al. ................ 526/126 |
| 6,025,448 A | 2/2000 | Swindoll et al. ........ 526/127 |
| 6,060,567 A | 5/2000 | Lai et al. ................ 526/126 |
| 6,136,937 A * | 10/2000 | Lai et al. ................ 526/352 |
| 6,534,612 B1 * | 3/2003 | Lai et al. ................ 526/348 |

OTHER PUBLICATIONS

*Polymer Preprints, Amer. Chem. Society,* vol. 12, No. 1, pp. 277–281 (Mar. 1971), "Evidence of Long–Chain Branching in High Density Polyethylene" by E. E. Drott and R. A. Mendelson.

*Journal of the American Chemical Society,* 96:7, pp. 1729–1742 (Mar. 31, 1976) "Structure and Chemistry of Bisicyclopentadienyl)–MLn Complexes" by Joseph W. Lauber and Roald Hoffman.

*Polymer Engineering and Science,* vol. 16, No. 12, pp. 811–816 (Dec. 1976), "Influence of Long–Chain Branching on the Viscoelastic Properties of Low–Density Polyethylenes" by L. Wild, R. Ranganath, and D. Knobeloch.

*Angew. Chem. Int. Ed. Engl,* pp. 630–632 (1976) vol. 15, No. 10 "Halogen•Free Soluble Ziegler Catalysts for the Polymerization of Ethylene. Control of Molecular Weight by Choice of Temperature" by Arne Andresen et al.

*Advances in Organometallic Chemistry,* pp. 99–146, vol. 18, (1980) "Ziegler–Natta Catalysis" by Hansjorg Sinn and Walter Kaminsky.

Derwent 90–239017/31.

*Advances In Polyolefins,* by R. B. Seymour and T. Cheng. (1987) "Polymerization of Olefins With A Homogeneous Zirconium/Alumoxane Catalyst", pp. 361–371 by W. Kaminsky and R. Hahnsen.

*1991 Specialty Polyolefins Conference Proceedings,* "The Marketing Challenge Created By Single Site Catalysts in Polyolefins," Sep. 24, 1991, (pp. 41–45) by Michael P. Jeffries.

*High Polymers,* vol. XX, "Crystalline Olefin Polymers" Part I, pp. 495–501, Raff et al.

*1991 Polymers, Laminations & Coatings Conference.* TAPPI Proceedings, presented in Feb., 1991, pp. 289–296, "A New Family of Linear Ethylene Polymers with Enhanced Sealing Performance" by D. Van•der Sanden and R. W. Halle.

*Society of Plastic Engineers 1991 Specialty Polyolefins Conference Proceedings,* pp. 41–55, "The Marketing Challenge Created by Single Site Catalysts in Polyolefins" by M. Jeffries (Sep. 24, 19910.

*Advances In Polyolefins,* by R. B. Seymour and T. Cheng, (1987), pp. 373–380 "Crystallinity and Morphology of Ethylene α–Olefin Copolymers" by P. Schouterden. G. Groeninckx. and H. Reynaers.

*Advances In Polyolefins.* by R. B. Seymour and T. Cheng, (1987) New Catalysis and Process For Ethylene Polymerization, pp. 337–354, by F. Karol, B. Wagner, L. Levine, G. Goeke, and A. Nosbay.

*Journal of Macromolecular Science: Reviews in Macromolecular Chemistry and Physics,* C29(2&3), pp. 201–303 (1989) "A Review of High Resolution Liquid $^{T3}$ Carbon Nuclear Magnetic Resonance Characterization of Ethylene–Based Polymers", J. C. Randall.

*Journal of Non–Newtonian Fluid Mechanics,* 36, pp. 255–263 (1990) "Additional Observations on The Surface Melt Fracture Behavior Of Linear Low–Density Polyethylene" by R. Moynihan, D. Baird, and R. Ramanathan.

*Makromol. Chem. Rapid Commun.,* pp. 89–94 (1990) "Terpolymers of Ethylene, Propene and 1.5–Hexadiene Synthesized with Zirconocene/Methylaluminoxane" by W. Kaminsky and H. Drogemuller.

*Journal of Rheology,* 35 (4) ,3 (May, 1991) pp. 497–452, "Wall Slip of Molten High Density Polyethylene. I. Sliding Plate Rheometer Studies" by S. G. Hatzikiriakos and J. M. Dealy.

*Proceedings of the 1991 IEEE Power Engineering Society,* pp. 184–190 (Sep. 22–27, 1991). New Specialty Linear Polymers (SLP) For Power Cables by Monica Hendewerk and Lawrence Spenadel.

*Society of Plastic Engineers Proceedings,* Polyolefins VII International Conference, Feb. 24–27, 1991, Structure/Property Relationships In Exxpol ™ Polymers (pp. 45–66) by C. Speed, B. Trudell, A. Mehta, and F. Stebling.

*Journal of Applied Polymer Science,* pp. 3751–3765 (1985) vol. 30, "On the Effects of Very Low Levels of Long Chain Branching on Rheological Behavior in Polyethylene" by B. H. Bersted.

*Journal of Polymer Science: Polymer Chemistry Edition,* pp. 2151–2164 (1985) vol. 23, "Ethylene Propylene Diene Terpolymers Produced with a Homogeneous and Highly Active Zirconium Catalyst" by Walter Kiminsky et al.

*The Society of Rheology,* pp. 337–357 (1986) vol. 30, "Wall Slip in Viscous Fluids and Influence of Materials of Construction" by A. V. Ramamurthy.

*Makromol. Chem., Macromol. Symp.,* 4, pp. 103–118 (1986) "Elastomers By Atactic Linkage of α–Olefins Using Soluble Ziegler Catalysts" by W. Kaminsky and M. Schlobohm.

*Journal of Rheology,* 31 (8) pp. 815–834 (1987) "Wall Slip and Extrudate Distortion in Linear Low Density Polyethylene" by D. Kalika and M. Denn.

*Makromol. Chem.,* 190, pp. 515–526 (1989) "Copolymerization of Cycloalkenes with Ethylene In Presence of Chiral Zirconocene Catalysts" by W. Kaminsky and R. Spiehl.

*Angew. Chem. Int. Ed. Engl.,* pp. 390–393, vol. 19 No. 5 (1980) ""Living Polymers" on Polymerization with Extremely Productive Ziegler Catalysts" by Hansjorg Sinn, Walter Kiminsky, Hans–Jurgen Vollmer, and Rudiger Woldt.

*Polymer Bullentin,* 9, pp. 464–469 (1983) "Halogen Free Soluble Ziegler Catalysts with Methylalumoxan as Catalyst" by Jens Herwig and Walter Kaminsky.

*Makromol. Chem., Rapid Commun.,* 4, pp. 417–421 (1983) "Bis(cyclopentadienyl)zirkon–Verbingungen und Aluminoxan als Ziegler–Katalysatoren lur die Polymerisation und Copolymerisation von Olefinen" by Walter Kaminsky et al.

*ANTEC Proceedings,* pp. 306–309 (1983), "Analysis of Long Chain Branching in High Density Polyethylene" by J.K. Hughes.

*Makromol. Chem. Rapid Communn..* (5) pp. 225–228 (1984) "Influence of hydrogen on the polymerization of ethylene with the homogeneous Ziegler system bis(cyclopentadienyl)zirconiumdicholoride/aluminoxane" by Walter Kaminsky et al.

*Journal of Polymer Science: Polymer Chemistry Edition,* pp. 2117–2133 (1985) vol. 23, "Homogeneous a Ziegler–Natta Catalysis. II. Ethylene Polymerization by IV B Transition Metal Complexes Methyl Aluminoxane Catalyst Sytems" by E. Giannetti and R. Marzocchi.

\* cited by examiner

FIG. 5
HEAT SEAL PERFORMANCE COMPARISON

US 6,849,704 B2

ELASTIC SUBSTANTIALLY LINEAR OLEFIN POLYMERS

CROSS REFERENCE TO RELATED APPLICATIONS

This application is a Continuation of U.S. patent application Ser. No. 10/270,212 filed Oct. 11, 2002 now U.S. Pat. No. 6,737,484, which is a Continuation of U.S. patent application Ser. No. 09/884,261, filed Jun. 19, 2001, now U.S. Pat. No. 6,548,611 B2 which is a Continuation of application Ser. No. 08/925,827, filed on Sep. 5, 1997, now abandoned, which is a Continuation of application Ser. No. 08/730,766, filed on Oct. 16, 1996, now U.S. Pat. No. 5,665,800, which is a Continuation of application Ser. No. 08/606,633, filed on Feb. 26, 1996, now abandoned, which is a Continuation of application Ser. No. 08/433,784, filed on May 3, 1995, now abandoned, which is a Division of application Ser. No. 08/370,051, filed on Jan. 9, 1995, now U.S. Pat. No. 5,525,695, which is a Division of application Ser. No. 08/044,426, filed on Apr. 7, 1993, now U.S. Pat. No. 5,380,810, which is a Division of application Ser. No. 07/776,130, filed Oct. 15, 1991, now U.S. Pat. No. 5,272,236.

FIELD OF THE INVENTION

This invention relates to elastic substantially linear olefin polymers having improved processability, e.g., low susceptibility to melt fracture, even under high shear stress extrusion conditions. Methods of manufacturing these polymers are also disclosed.

BACKGROUND OF THE INVENTION

Molecular weight distribution (MWD), or polydispersity, is a well known variable in polymers. The molecular weight distribution, sometimes described as the ratio of weight average molecular weight ($M_w$) to number average molecular weight ($M_n$) (i.e., $M_w/M_n$) can be measured directly, e.g., by gel permeation chromatography techniques, or more routinely, by measuring $I_{10}/I_2$ ratio, as described in ASTM D-1238. For linear polyolefins, especially linear polyethylene, it is well known that as $M_w/M_n$ increases, $I_{10}/I_2$ also increases.

John Dealy in "Melt Rheology and Its Role in Plastics Processing" (Van Nostrand Reinhold, 1990) page 597 discloses that ASTM D-1238 is employed with different loads in order to obtain an estimate of the shear rate dependence of melt viscosity, which is sensitive to weight average molecular weight ($M_w$) and number average molecular weight ($M_n$).

Bersted in Journal of Applied Polymer Science Vol. 19, page 2167–2177 (1975) theorized the relationship between molecular weight distribution and steady shear melt viscosity for linear polymer systems. He also showed that the broader MWD material exhibits a higher shear rate or shear stress dependency.

Ramamurthy in *Journal of Rheology*, 30(2), 337–357 (1986), and Moynihan, Baird and Ramanathan in Journal of Non-Newtonian Fluid Mechanics, 36, 255–263 (1990), both disclose that the onset of sharkskin (i.e., melt fracture) for linear low density polyethylene (LLDPE) occurs at an apparent shear stress of 1–1.4×10$^6$ dyne/cm$^2$, which was observed to be coincident with the change in slope of the flow curve. Ramamurthy also discloses that the onset of surface melt fracture or of gross melt fracture for high pressure low density polyethylene (HP-LDPE) occurs at an apparent shear stress of about 0.13 MPa (1.3×10$^6$ dynes/cm$^2$).

Kalika and Denn in *Journal of Rheology*, 31, 815–834 (1987) confirmed the surface defects on sharkskin phenomena for LLDPE, but the results of their work determined a critical shear stress of 2.3×10$^6$ dyne/cm$^2$, significantly higher than that found by Ramamurthy and Moynihan et al.

International Patent Application (Publication No. WO 90/03414) published Apr. 5, 1990, discloses linear ethylene interpolymer blends with narrow molecular weight distribution and narrow short chain branching distributions (SCBDs). The melt processibility of the interpolymer blends is controlled by blending different molecular weight interpolymers having different narrow molecular weight distributions and different SCBDs.

Exxon Chemical Company, in the Preprints of Polyolefins VII International Conference, page 45–66, Feb. 24–27 1991, disclose that the narrow molecular weight distribution (NMWD) resins produced by their EXXPOL™ technology have higher melt viscosity and lower melt strength than conventional Ziegler resins at the same melt index. In a recent publication, Exxon Chemical Company has also taught that NMWD polymers made using a single site catalyst create the potential for melt fracture ("New Specialty Linear Polymers (SLP) For Power Cables," by Monica Hendewerk and Lawrence Spenadel, presented at IEEE meeting in Dallas, Tex., September, 1991).

Previously known narrow molecular weight distribution linear polymers disadvantageously possessed low shear sensitivity or low $I_{10}/I_2$ value, which limits the extrudability of such polymers. Additionally, such polymers possessed low melt elasticity, causing problems in melt fabrication such as film forming processes or blow molding processes (e.g., sustaining a bubble in the blown film process, or sag in the blow molding process etc.). Finally, such resins also experienced melt fracture surface properties at relatively low extrusion rates thereby processing unacceptably.

SUMMARY OF THE INVENTION

We have now discovered a new family of substantially linear-olefin polymers which have many improved properties and a method of their manufacture. The substantially linear olefin polymers have (1) high melt elasticity and, (2) relatively narrow molecular weight distributions with exceptionally good processibility while maintaining good mechanical properties and (3) they do not melt fracture over a broad range of shear stress conditions. These properties are obtained without benefit of specific processing additives. The new polymers can be successfully prepared in a continuous polymerization process using constrained geometry catalyst technology, especially when polymerized utilizing solution process technology.

The improved properties of the polymers include improved melt elasticity and processability in thermal forming processes such as extrusion, blowing film, injection molding and blowmolding.

Substantially linear polymers made according to the present invention have the following novel properties:

a) a melt flow ratio, $I_{10}/I_2$, $\geq 5.63$, b) a molecular weight distribution, $M_w/M_n$, defined by the equation:

$$M_w/M_n \leq (I_{10}/I_2) - 4.63, \text{ and}$$

c) a critical shear stress at onset of gross melt fracture of greater than about 4×10$^6$ dyne/cm$^2$.

DETAILED DESCRIPTION OF THE INVENTION

Other properties of the substantially linear polymers include:

a) a density from about 0.85 grams/cubic centimeter (g/cc) to about 0.97 g/cc (tested in accordance with ASTM D-792), and b) a melt index, MI, from about 0.01 grams/10 minutes to about 1000 gram/10 minutes.

Preferably the melt flow ratio, $I_{10}/I_2$, is from about 7 to about 20.

The molecular weight distribution (i.e., $M_w/M_n$) is preferably less than about 5, especially less than about 3.5, and most preferably from about 1.5 to about 2.5.

Throughout this disclosure, "melt index" or "$I_2$" is measured in accordance with ASTM D-1238 (190/2.16); "$I_{10}$" is measured in accordance with ASTM D-1238 (190/10).

The melt tension of these new polymers is also surprisingly good, e.g., as high as about 2 grams or more, especially for polymers which have a very narrow molecular weight distribution (i.e., $M_w/M_n$ from about 1.5 to about 2.5).

The substantially linear polymers of the present invention can be homopolymers of $C_2$–$C_{20}$ olefins, such as ethylene, propylene, 4-methyl-1-pentene, etc., or they can be interpolymers of ethylene with at least one $C_3$–$C_{20}$ α-olefin and/or $C_2$–$C_{20}$ acetylenically unsaturated monomer and/or $C_4$–$C_{18}$ diolefins. The substantially linear polymers of the present invention can also be interpolymers of ethylene with at least one of the above $C_3$–$C_{20}$ α-olefins, diolefins and/or acetylenically unsaturated monomers in combination with other unsaturated monomers.

Monomers usefully polymerized according to the present invention include, for example, ethylenically unsaturated monomers, acetylenic compounds, conjugated or nonconjugated dienes, polyenes, carbon monoxide, etc. Preferred monomers include the $C_{2-10}$ α-olefins especially ethylene, propylene, isobutylene, 1-butene, 1-hexene, 4-methyl-1-pentene, and 1-octene. Other preferred monomers include styrene, halo- or alkyl substituted styrenes, tetrafluoroethylene, vinylbenzocyclobutane, 1,4-hexadiene, and naphthenics (e.g., cyclo-pentene, cyclo-hexene and cyclo-octene).

The term "substantially linear" polymers means that the polymer backbone is either unsubstituted or substituted with up to 3 long chain branches/1000 carbons. Preferred polymers are substituted with about 0.01 long chain branches/1000 carbons to about 3 long chain branches/1000 carbons, more preferably from about 0.01 long chain branches/1000 carbons to about 1 long chain branches/1000 carbons and especially from about 0.3 long chain branches/1000 carbons to about 1 long chain branches/1000 carbons.

Long chain branching is defined herein as a chain length of at least about 6 carbons, above which the length cannot be distinguished using $^{13}C$ nuclear magnetic resonance spectroscopy. The long chain branch can be as long as about the same length as the length of the polymer back-bone.

Long chain branching is determined by using $^{13}C$ nuclear magnetic resonance (NMR) spectroscopy and is quantified using the method of Randall (*Rev. Macromol. Chem. Phys.*, C29 (2&3). p 285–297), the disclosure of which is incorporated herein by reference.

"Melt tension" is measured by a specially designed pulley transducer in conjunction with the melt indexer. Melt tension is the load that the extrudate or filament exerts while passing over the pulley at the standard speed of 30 rpm. The melt tension measurement is similar to the "Melt Tension Tester" made by Toyoseiki and is described by John Dealy in "Rheometers for Molten Plastics", published by Van Nostrand Reinhold Co. (1982) on page 250–251.

The "rheological processing index" (PI) is the apparent viscosity (in kpoise) of a polymer measured by a gas extrusion rheometer (GER). The gas extrusion rheometer is described by M. Shida, R. N. Shroff and L. V. Cancio in *Polymer Engineering Science*, Vol. 17, no. 11, p. 770 (1977), and in "Rheometers for Molten Plastics" by John Dealy, published by Van Nostrand Reinhold Co. (1982) on page 77, both publications of which are incorporated by reference herein in their entirety. All GER experiments are performed at a temperature of 190° C., at nitrogen pressures between 5250 to 500 psig using a 0.0296 inch diameter, 20:1 L/D·die. An apparent shear stress vs. apparent shear rate plot is used to identify the melt fracture phenomena. According to Ramamurthy in *Journal of Rheology*, 30(2), 337–357, 1986, above a certain critical flow rate, the observed extrudate irregularities may be broadly classified into two main types: surface melt fracture and gross melt fracture.

Surface melt fracture occurs under apparently steady flow conditions and ranges in detail from loss of specular gloss to the more severe form of "sharkskin". Gross melt fracture occurs at unsteady flow conditions and ranges in detail from regular (alternating rough and smooth, helical, etc.) to random distortions. For commercial acceptability, (e.g., in blown film products), surface defects should be minimal, if not absent. The critical shear rate at onset of surface melt fracture (OSMF) and onset of gross melt fracture (OGMF) will be used herein based on the changes of surface roughness and configurations of the extrudates extruded by a GER. Preferably, the critical shear stress at the OGMF and the critical shear stress at the OSMF for the substantially linear ethylene polymers described herein is greater than about $4 \times 10^6$ dyne/cm$^2$ and greater than about $2.8 \times 10^6$ dyne/cm$^2$, respectively.

For the polymers described herein, the PI is the apparent viscosity (in kpoise) of a material measured by GER at a temperature of 190° C., at nitrogen pressure of 2500 psig using a 0.0296 inch diameter, 20:1 L/D die, or corresponding apparent shear stress of $2.15 \times 10^6$ dyne/cm$^2$. The novel polymers described herein preferably have a PI in the range of about 0.01 kpoise to about 50 kpoise, preferably about 15 kpoise or less.

The SCBPDI (Short Chain Branch Distribution Index) or CDBI (Composition Distribution Branch Index) is defined as the weight percent of the polymer molecules having a comonomer content within 50 percent of the median total molar comonomer content. The CDBI of an polymer is readily calculated from data obtained from techniques known in the art, such as, for example, temperature rising elution fractionation (abbreviated herein as "TREF") as described, for examples in Wild et al, *Journal of Polymer*

Science, Poly. Phys. Ed., Vol. 20, p. 441 (1982), or in U.S. Pat. No. 4,798,081, both disclosures of which are incorporated herein by reference. The SCBDI or CDBI for the new polymers of the present invention is preferably greater than about 30 percent, especially greater than about 50 percent.

Figure 2:
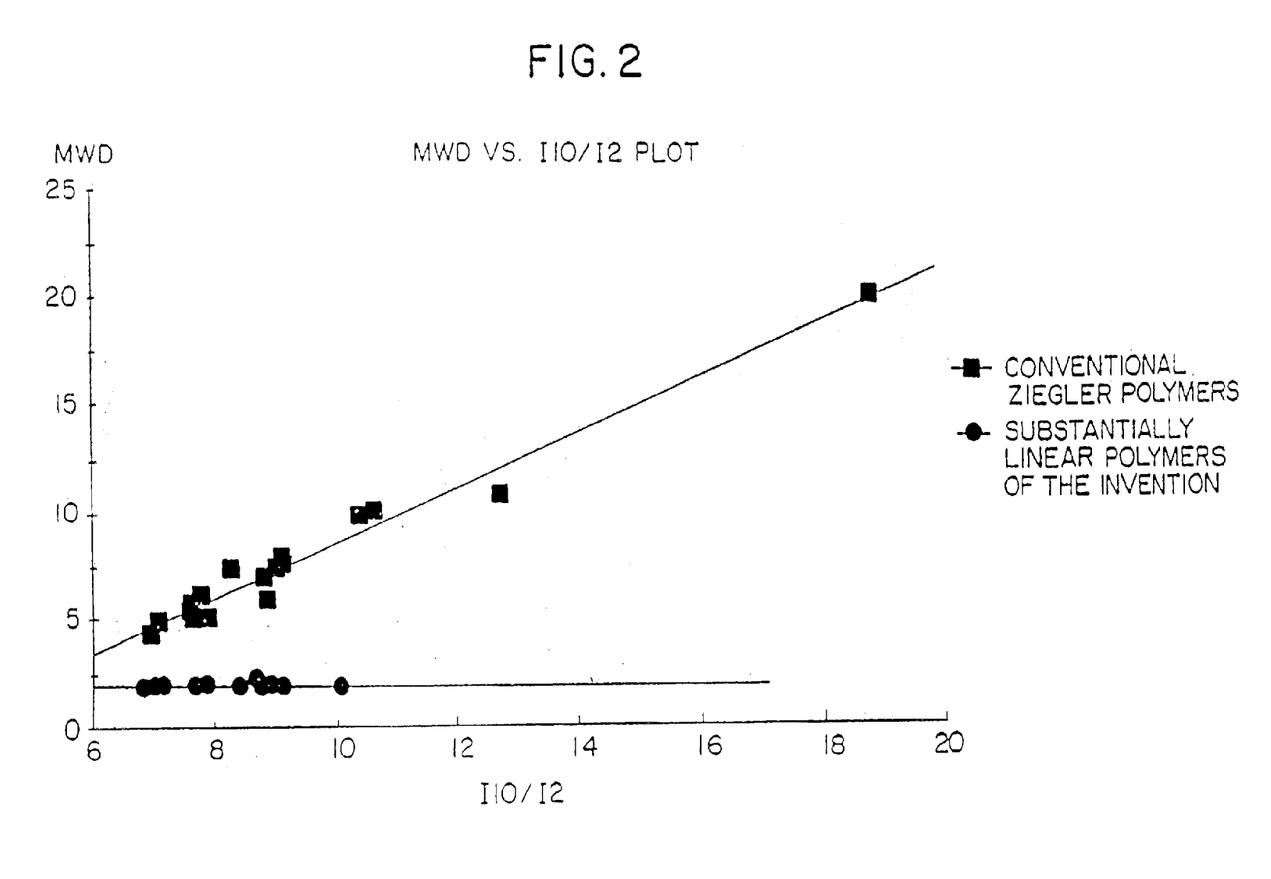
FIG. 2 plots data describing the relationship between $I_{10}I_2$ and $M_w/M_n$ for polymer Examples 5 and 6 of the invention, and from comparative examples 7–9.

The most unique characteristic of the presently claimed polymers is a highly unexpected flow property as shown in FIG. 2, where the $I_{10}/I_2$ value is essentially independent of polydispersity index (i.e. $M_w/M_n$). This is contrasted with conventional polyethylene resins having rheological properties such that as the polydispersity index increases, the $I_{10}/I_2$ value also increases. Measurement of the polydispersity index is done according to the following technique:

The polymers are analyzed by gel permeation chromatography (GPC) on a Waters 150C high temperature chromatographic unit equipped with three linear mixed bed columns (Polymer Laboratories (10 micron particle size)), operating at a system temperature of 140° C. The solvent is 1,2,4-trichlorobenzene, from which about 0.5% by weight solutions of the samples are prepared for injection. The flow rate is 1.0 milliliter/minute and the injection size is 100 microliters.

The molecular weight determination is deduced by using narrow molecular weight distribution polystyrene standards (from Polymer Laboratories) in conjunction with their elution volumes. The equivalent polyethylene molecular weights are determined by using appropriate Mark-Houwink coefficients for polyethylene and polystyrene (as described by Williams and Word in *Journal of Polymer Science, Polymer Letters*, Vol. 6, (621) 1968, incorporated herein by reference) to derive the equation:

$$M_{polyethylene} = (a)(M_{polystyrene})^b$$

In this equation, a=0.4316 and b=1.0. Weight average molecular weight, $M_w$, is calculated in the usual manner according to the formula:

$$M_w = (R)(w_i)(M_i)$$

where $w_i$ and $M_i$ are the weight fraction and molecular weight respectively of the ith fraction eluting from the GPC column.

Another highly unexpected characteristic of the polymers of the present invention is their non-susceptibility to melt fracture or the formation of extrudate defects during high pressure, high speed extrusion. Preferably, polymers of the present invention do not experience "sharkskin" or surface melt fracture during the GER extrusion process even at an extrusion pressure of 5000 psi and corresponding apparent stress of $4.3 \times 10^6$ dyne/cm². In contrast, a conventional LLDPE experiences "sharkskin" or onset of surface melt fracture (OSMF) at an apparent stress under comparable conditions as low as $1.0-1.4 \times 10^6$ dyne/cm².

Improvements of melt elasticity and processibility over conventional LLDPE resins with similar MI are most pronounced when $I_2$ is lower than about 3 grams/10 minutes. Improvements of physical properties such as strength properties, heat seal properties, and optical properties, over the conventional LLDPE resins with similar MI, are most pronounced when $I_2$ is lower than about 100 grams/10 minutes. The substantially linear polymers of the present invention have processibility similar to that of High Pressure LDPE while possessing strength and other physical properties similar to those of conventional LLDPE, without the benefit of special adhesion promoters (e.g., processing additives such as Viton™ fluoroelastomers made by E.I. DuPont de Nemours & Company).

The improved melt elasticity and processibility of the substantially linear polymers according to the present invention result, it is believed, from their method of production. The polymers may be produced via a continuous controlled polymerization process using at least one reactor, but can also be produced using multiple reactors (e.g., using a multiple reactor configuration as described in U.S. Pat. No. 3,914,342, incorporated herein by reference) at a polymerization temperature and pressure sufficient to produce the interpolymers having the desired properties. According to one embodiment of the present process, the polymers are produced in a continuous process, as opposed to a batch process. Preferably, the polymerization temperature is from about 20° C. to about 250° C., using constrained geometry catalyst technology. If a narrow molecular weight distribution polymer ($M_w/M_n$ of from about 1.5 to about 2.5) having a higher $I_{10}/I_2$ ratio (e.g. $I_{10}/I_2$ of about 7 or more, preferably at least about 8, especially at least about 9) is desired, the ethylene concentration in the reactor is preferably not more than about 8 percent by weight of the reactor contents, especially not more than about 4 percent by weight of the reactor contents. Preferably, the polymerization is performed in a solution polymerization process. Generally, manipulation or $I_{10}/I_2$ while holding $M_w/M_n$ relatively low for producing the novel polymers described herein is a function of reactor temperature and/or ethylene concentration. Reduced ethylene concentration and higher temperature generally produces higher $I_{10}/I_2$.

Suitable catalysts for use herein preferably include constrained geometry catalysts as disclosed in U.S. application Ser. Nos. 545,403, filed Jul. 3, 1990; 758,654, filed Sep. 12, 1991 now U.S. Pat. No. 5,132,380; 758,660, filed Sep. 12, 1991 now abandoned; and 720,041, filed Jun. 24, 1991 now abandoned, the teachings of all of which are incorporated herein by reference.

The monocyclopentadienyl transition metal olefin polymerization catalysts taught in U.S. Pat. No. 5,026,798, the teachings of which are incorporated herein by reference, are also suitable for use in preparing the polymers of the present invention.

The foregoing catalysts may be further described as comprising a metal coordination complex comprising a metal of groups 3–10 or the Lanthanide series of the Periodic Table of the Elements and a delocalized n-bonded moiety substituted with a constrain-inducing moiety, said complex having a constrained geometry about the metal atom such that the angle at the metal between the centroid of the delocalized, substituted n-bonded moiety and the center of at least one remaining substituent is less than such angle in a similar complex containing a similar n-bonded moiety lacking in such constrain-inducing substituent, and provided further that for such complexes comprising more than one delocalized, substituted n-bonded moiety, only one thereof for each metal atom of the complex is a cyclic, delocalized, substituted n-bonded moiety. The catalyst further comprises an activating cocatalyst.

Preferred catalyst complexes correspond to the formula:

I wherein

M is a metal of group 3–10, or the Lanthanide series of the Periodic Table of the Elements:

Cp* is a cyclopentadienyl or substituted cyclopentadienyl group bound in an $\eta^5$ bonding mode to M;

Z is a moiety comprising boron, or a member of group 14 of the Periodic Table of the Elements, and optionally sulfur or oxygen, said moiety having up to 20 non-hydrogen atoms and optionally Cp* and Z together form a fused ring system;

X independently each occurrence is an anionic ligand group or neutral Lewis base ligand group having up to 30 non-hydrogen atoms;

n is 0, 1, 2, 3, or 4 and is 2 less than the valence of M; and

Y is an anionic or nonanionic ligand group bonded to Z and M comprising nitrogen, phosphorus, oxygen or sulfur and having up to 20 non-hydrogen atoms, optionally Y and Z together form a fused ring system.

More preferably still, such complexes correspond to the formula:

wherein R' each occurrence is independently selected from the group consisting of hydrogen, alkyl, aryl, silyl, germyl, cyano, halo and combinations thereof having up to 20 non-hydrogen atoms;

X each occurrence independently is selected from the group consisting of hydride, halo, alkyl, aryl, silyl, germyl, aryloxy, alkoxy, amide, siloxy, neutral Lewis base ligands and combinations thereof having up to 20 non-hydrogen atoms;

Y is —O—, —S—, —NR*—, —PR*— or a neutral two electron donor ligand selected from the group consisting of OR*, SR*, NR*$_2$ or PR*$_2$;

M is a previously defined; and

Z is SiR*$_2$, CR*$_2$, SiR*$_2$SiR*$_2$, CR*$_2$CR*$_2$, CR*=CR*, CR*$_2$SiR*$_2$, GeR*$_2$, BR*, BR*$_2$; wherein:

R* each occurrence is independently selected from the group consisting of hydrogen, alkyl, aryl, silyl, halogenated alkyl, halogenated aryl groups having up to 20 non-hydrogen atoms, and mixtures thereof, or two or more R* groups from Y, Z, or both Y and Z form a fused ring system; and n is 1 or 2.

It should be noted that whereas formula I and the following formulas indicate a cyclic structure for the catalysts, when Y is a neutral two electron donor ligand, the bond between M and Y is more accurately referred to as a coordinate-covalent bond. Also, it should be noted that the complex may exist as a dimer or higher oligomer.

Further preferably, at least one of R', Z, or R* is an electron donating moiety. Thus, highly preferably Y is a nitrogen or phosphorus containing group corresponding to the formula —N(R")— or —P(R")—, wherein R" is C$_{1-10}$ alkyl or aryl, ie. an amido or phosphido group.

Most highly preferred complex compounds are amidosilane- or amidoalkanediyl-compounds corresponding to the formula:

wherein:

M is titanium, zirconium or hafnium, bound in an $\eta^5$ bonding mode to the cyclopentadienyl group;

R' each occurrence is independently selected from the group consisting of hydrogen, silyl, alkyl, aryl and combinations thereof having up to 10 carbon or silicon atoms;

E is silicon or carbon;

X independently each occurrence is hydride, halo, alkyl, aryl, aryloxy or alkoxy of up to 10 carbons;

m is 1 or 2; and n is 1 or 2.

Examples of the above most highly preferred metal coordination compounds include compounds wherein the R' on the amido group is methyl, ethyl, propyl, butyl, pentyl, hexyl, (including isomers), norbornyl, benzyl, phenyl, etc.; the cyclopentadienyl group is cyclopentadienyl, indenyl, tetrahydroindenyl, fluorenyl, octahydrofluorenyl, etc.; R' on the foregoing cyclopentadienyl groups each occurrence is hydrogen, methyl, ethyl, propyl, butyl, pentyl, hexyl, (including isomers), norbornyl, benzyl, phenyl, etc., and X is chloro, bromo, iodo, methyl, ethyl, propyl, butyl, pentyl, hexyl, (including isomers), norbornyl, benzyl, phenyl, etc. Specific compounds include: (tert-butylamido) (tetramethyl-$\eta^5$-cyclopentadienyl)-1,2-ethanediylzirconium dichloride, (tert-butylamido)(tetramethyl-$\eta^5$-cyclopentadienyl)-1,2-ethanediyltitanium dichloride, (methylamido)(tetramethyl-$\eta^5$-cyclopentadienyl)-1,2-ethanediylzirconium dichloride, (methylamido) (tetramethyl-$\eta^5$-cyclopentadienyl)-1,2-ethanediyltitanium dichloride, (ethylamido)(tetramethyl-$\eta^5$-cyclopentadienyl)-methylenetitanium dichloro, (tert-butylamido)dibenzyl(tetramethyl-$\eta^5$-cyclopentadienyl) silanezirconium dibenzyl, (benzylamido)dimethyl-(tetramethyl-$\eta^5$-cyclopentadienyl)silanetitanium dichloride, (phenylphosphido)dimethyl(tetramethyl-$\eta^5$-cyclopentadienyl)silanezirconium dibenzyl, (tert-butylamido)dimethyl(tetramethyl-$\eta^5$-cyclopentadienyl) silanetitanium dimethyl, and the like.

The complexes may be prepared by contacting a derivative of a metal, M, and a group I metal derivative or Grignard derivative of the cyclopentadienyl compound in a solvent and separating the salt byproduct. Suitable solvents for use in preparing the metal complexes are aliphatic or aromatic liquids such as cyclohexane, methylcyclohexane, pentane, hexane, heptane, tetrahydrofuran, diethyl ether, benzene, toluene, xylene, ethylbenzene, etc., or mixtures thereof.

In a preferred embodiment, the metal compound is MX$_{n+i}$, i.e. M is in a lower oxidation state than in the corresponding compound, MX$_{n+2}$ and the oxidation state of M in the desired final complex. A noninterfering oxidizing agent may thereafter be employed to raise the oxidation state of the metal. The oxidation is accomplished merely by contacting the reactants utilizing solvents and reaction conditions used in the preparation of the complex itself. By the term "noninterfering oxidizing agent" is meant a compound having an oxidation potential sufficient to raise the metal oxidation state without interfering with the desired complex formation or subsequent polymerization processes. A particularly suitable noninterfering oxidizing agent is AgCl or an organic halide such as methylene chloride. The foregoing techniques are disclosed in U.S. Ser. Nos. 545,403, filed Jul. 3, 1990 and 702,475, filed May 20, 1991 now abandoned, the teachings of both of which are incorporated herein by reference.

Additionally the complexes may be prepared according to the teachings of the copending application Ser. No. 07/778, 433 entitled: "Preparation of Metal Coordination Complex (I)", filed in the names of Peter Nickias and David Wilson, on Oct. 15, 1991 and the copending application Ser. No. 07/778,432 entitled: "Preparation of Metal Coordination Complex (II)", filed in the names of Peter Nickias and David Devore, on Oct. 15, 1991 both abandoned, the teachings of which are incorporated herein by reference thereto.

Suitable cocatalysts for use herein include polymeric or oligomeric alumoxanes especially methyl alumoxane, as well as inert, compatible, noncoordinating, ion forming compounds. Preferred cocatalysts are inert, noncoordinating, boron compounds.

Ionic active catalyst species which can be used to polymerize the polymers described herein correspond to the formula:

wherein:

M is a metal of group 3–10, or the Lanthanide series of the Periodic Table of the Elements;

Cp* is a cyclopentadienyl or substituted cyclopentadienyl group bound in an $\eta^5$ bonding mode to M;

Z is a moiety comprising boron, or a member of group 14 of the Periodic Table of the Elements, and optionally sulfur or oxygen, said moiety having up to 20 non-hydrogen atoms, and optionally Cp* and Z together form a fused ring system;

X independently each occurrence is an anionic ligand group or neutral Lewis base ligand group having up to 30 non-hydrogen atoms;

n is 0, 1, 2, 3, or 4 and is 2 less than the valence of M; and $A^-$ is a noncoordinating, compatible anion.

One method of making the ionic catalyst species which can be utilized to make the polymers of the present invention involve combining:

a) at least one first component which is a mono (cyclopentadienyl) derivative of a metal of Group 3–10 or the Lanthanide Series of the Periodic Table of the Elements containing at least one substituent which will combine with the cation of a second component (described hereinafter) which first component is capable of forming a cation formally having a coordination number that is one less than its valence, and b) at least one second component which is a salt of a Bronsted acid and a noncoordinating, compatible anion.

More particularly the noncoordinating, compatible anion of the Bronsted acid salt may comprise a single coordination complex comprising a charge-bearing metal or metalloid core, which anion is both bulky and non-nucleophilic. The recitation "metalloid", as used herein, includes non-metals such as boron, phosphorus and the like which exhibit semi-metallic characteristics.

Illustrative, but not limiting examples of monocyclopentadienyl metal components (first components) which may be used in the preparation of cationic complexes are derivatives of titanium, zirconium, hafnium, chromium, lanthanum, etc. Preferred components are titanium or zirconium compounds. Examples of suitable monocyclopentadienyl metal compounds are hydrocarbyl-substituted monocyclopentadienyl metal compounds such as (tert-butylamido)(tetramethyl-$\eta^5$-cyclopentadienyl)-1,2-ethanediylzirconium dimethyl, (tert-butylamido)(tetramethyl-$\eta^5$-cyclopentadienyl)-1,2-ethanediyltitanium dimethyl, (methylamido)(tetramethyl-$\eta^5$-cyclopentadienyl)-1,2-ethanediylzirconium dibenzyl, (methylamido)(tetramethyl-$\eta^5$-cyclopentadienyl)-1,2-ethanediyltitanium dimethyl, (ethylamido)(tetramethyl-$\eta^5$-cyclopentadienyl)-methylenetitanium dimethyl, (tert-butylamido)dibenzyl (tetramethyl-$\eta^5$-cyclopentadienyl) silanezirconium dibenzyl, (benzylamido)dimethyl-(tetramethyl-$\eta^5$-cyclopentadienyl)silanetitanium diphenyl, (phenylphosphido)dimethyl(tetramethyl-$\eta^5$-cyclopentadienyl)silanezirconium dibenzyl, and the like.

Such components are readily prepared by combining the corresponding metal chloride with a dilithium salt of the substituted cyclopentadienyl group such as a cyclopentadienyl-alkanediyl, cyclopentadienyl—silane amide, or cyclopentadienyl—phosphide compound. The reaction is conducted in an inert liquid such as tetrahydrofuran, $C_{5-10}$ alkanes, toluene, etc. utilizing conventional synthetic procedures. Additionally, the first components may be prepared by reaction of a group II derivative of the cyclopentadienyl compound in a solvent and separating the salt by-product. Magnesium derivatives of the cyclopentadienyl compounds are preferred. The reaction may be conducted in an inert solvent such as cyclohexane, pentane, tetrahydrofuran, diethyl ether, benzene, toluene, or mixtures of the like. The resulting metal cyclopentadienyl halide complexes may be alkylated using a variety of techniques. Generally, the metal cyclopentadienyl alkyl or aryl complexes may be prepared by alkylation of the metal cyclopentadienyl halide complexes with alkyl or aryl derivatives or group I or group II metals. Preferred alkylating agents are alkyl lithium and Grignard derivatives using conventional synthetic techniques. The reaction may be conducted in an inert solvent such as cyclohexane, pentane, tetrahydrofuran, diethyl ether, benzene, toluene, or mixtures of the like. A preferred solvent is a mixture of toluene and tetrahydrofuran.

Compounds useful as a second component in the preparation of the ionic catalysts useful in this invention will comprise a cation, which is a Bronsted acid capable of donating a proton, and a compatible noncoordinating anion. Preferred anions are those containing a single coordination complex comprising a charge-bearing metal or metalloid core which anion is relatively large (bulky), capable of stabilizing the active catalyst species (the Group 3–10 or Lanthanide Series cation) which is formed when the two components are combined and sufficiently labile to be displaced by olefinic, diolefinic and acetylenically unsaturated substrates or other neutral Lewis bases such as ethers, nitriles and the like. Suitable metals, then, include, but are not limited to, aluminum, gold, platinum and the like. Suitable metalloids include, but are not limited to, boron, phosphorus, silicon and the like. Compounds containing anions which comprise coordination complexes containing a single metal or metalloid atom are, of course, well known and many, particularly such compounds containing a single boron atom in the anion portion, are available commercially. In light of this, salts containing anions comprising a coordination complex containing a single boron atom are preferred.

Highly preferably, the second component useful in the preparation of the catalysts of this invention may be represented by the following general formula:

wherein:

L is a neutral Lewis base;

(L-H) is a Bronsted acid; and $[A]^-$ is a compatible, noncoordinating anion.

More preferably $[A]^-$ corresponds to the formula:

wherein:

M' is a metal or metalloid selected from Groups 5–15 of the Periodic Table of the Elements; and Q independently each occurrence is selected from the Group consisting of hydride, dialkylamido, halide, alkoxide, aryloxide, hydrocarbyl, and substituted-hydrocarbyl radicals of up to 20 carbons with the proviso that in not more than one occurrence is Q halide and q is one more than the valence of M'.

Second components comprising boron which are particularly useful in the preparation of catalysts of this invention may be represented by the following general formula:

$$[L-H]^+[BQ_4]$$

wherein:

L is a neutral Lewis base;

$[L-H]^+$ is a Bronsted acid;

B is boron in a valence state of 3; and

Q is as previously defined

Illustrative, but not limiting, examples of boron compounds which may be used as a second component in the preparation of the improved catalysts of this invention are trialkyl-substituted ammonium salts such as triethylammonium tetraphenylborate, tripropylammonium tetraphenylborate, tri(n-butyl)ammonium tetraphenylborate, trimethylammonium tetra(p-tolylborate), tributylammonium tetrakis-pentafluorophenylborate, tripropylammonium tetrakis-2,4-dimethylphenylborate. tributylammonium tetrakis-3,5-dimethylphenylborate, triethylammonium tetrakis-(3,5-di-trifluoromethylphenyl)borate and the like. Also suitable are N,N-dialkyl anilinium salts such as N,N-dimethyl-anilinium tetraphenylborate, N,N-diethylanilinium tetraphenylborate, N,N-2,4,6-pentamethylanilinium tetraphenylborate and the like; dialkyl ammonium salts such as di-(i-propyl)ammonium tetrakis-pentafluorophenylborate, dicyclohexylammonium tetraphenylborate and the like; and triaryl phosphonium salts such as triphenylphosphonium tetraphenylborate, tri(methylphenyl) phosphonium tetrakis-pentafluorophenylborate, tri (dimethylphenyl)phosphonium tetraphenylborate and the like.

Preferred ionic catalysts are those having a limiting charge separated structure corresponding to the formula:

wherein:

M is a metal of group 3–10, or the Lanthanide series of the Periodic Table of the Elements;

Cp* is a cyclopentadienyl or substituted cyclopentadienyl group bound in an $\eta^5$ bonding mode to M;

Z is a moiety comprising boron, or a member of group 14 of the Periodic Table of the Elements, and optionally sulfur or oxygen, said moiety having up to 20 non-hydrogen atoms, and optionally Cp* and Z together form a fused ring system;

X independently each occurrence is an anionic ligand group or neutral Lewis base ligand group having up to 30 non-hydrogen atoms;

n is 0, 1, 2, 3, or 4 and is 2 less than the valence of M; and $XA^{*-}$ is $^-XB(C_6F_5)_3$.

This class of cationic complexes may be conveniently prepared by contacting a metal compound corresponding to the formula:

wherein:

Cp, M, and n are as previously defined, with tris(pentafluorophenyl)borane cocatalyst under conditions to cause abstraction of X and formation of the anion $^-XB(C_6F_5)_3$.

Preferably X in the foregoing ionic catalyst is $C_1-C_{10}$ hydrocarbyl, most preferably methyl.

The preceding formula is referred to as the limiting, charge separated structure. However, it is to be understood that, particularly in solid form, the catalyst may not be fully charge separated. That is, the X group may retain a partial covalent bond to the metal atom, M. Thus, the catalysts may be alternately depicted as possessing the formula:

The catalysts are preferably prepared by contacting the derivative of a Group 4 or Lanthanide metal with the tris(pentafluorophenyl)borane in an inert diluent such as an organic liquid. Tris(pentafluorphenyl)borane is a commonly available Lewis acid that may be readily prepared according to known techniques The compound is disclosed in Marks, et al. *J. Am. Chem. Soc.* 1991, 113, 3623–3625 for use in alkyl abstraction of zirconocenes.

All reference to the Periodic Table of the Elements herein shall refer to the Periodic Table of the Elements, published and copyrighted by CRC Press, Inc., 1989. Also, any reference to a Group or Groups shall be to the Group or Groups as reflected in this Periodic Table of the Elements using the IUPAC system for numbering groups.

It is believed that in the constrained geometry catalysts used herein the metal atom is forced to greater exposure of the active metal site because one or more substituents on the single cyclopentadienyl or substituted cyclopentadienyl group forms a portion of a ring structure including the metal atom, wherein the metal is both bonded to an adjacent covalent moiety and held in association with the cyclopentadienyl group through an $\eta^5$ or other n-bonding interaction. It is understood that each respective bond between the metal atom and the constituent atoms of the cyclopentadienyl or substituted cyclopentadienyl group need not be equivalent. That is, the metal may be symmetrically or unsymmetrically n-bound to the cyclopentadienyl or substituted cyclopentadienyl group.

The geometry of the active metal site is further defined as follows. The centroid of the cyclopentadienyl or substituted cyclopentadienyl group may be defined as the average of the respective X, Y, and Z coordinates of the atomic centers forming the cyclopentadienyl or substituted cyclopentadienyl group. The angle, $\Theta$ formed at the metal center between the centroid of the cyclopentadienyl or substituted cyclopentadienyl group and each other ligand of the metal complex may be easily calculated by standard techniques of single crystal X-ray diffraction. Each of these angles may increase or decrease depending on the molecular structure of the constrained geometry metal complex. Those complexes wherein one or more of the angles, $\Theta$, is less than in a similar, comparative complex differing only in the fact that the constrain-inducing substituent is replaced by hydrogen have constrained geometry for purposes of the present invention. Preferably one or more of the above angles, Θ, decrease by at least 5 percent, more preferably 7.5 percent, compared to the comparative complex. Highly preferably, the average value of all bond angles, Θ, is also less than in the comparative complex.

Preferably, monocyclopentadienyl metal coordination complexes of group 4 or lanthanide metals according to the present invention have constrained geometry such that the smallest angle, Θ, is less than 115°, more preferably less than 110°, most preferably less than 105°.

Other compounds which are useful in the catalyst compositions of this invention, especially compounds containing other Group 4 or Lanthanide metals, will, of course, be apparent to those skilled in the art.

In general, the polymerization according to the present invention may be accomplished at conditions well known in the prior art for Ziegler-Natta or Kaminsky-Sinn type polymerization reactions, that is, temperatures from 0 to 250° C. and pressures from atmospheric to 1000 atmospheres (100 MPa). Suspension, solution, slurry, gas phase or other process conditions may be employed if desired. A support may be employed but preferably the catalysts are used in a homogeneous manner. It will, of course, be appreciated that the active catalyst system, especially nonionic catalysts, form in situ if the catalyst and the cocatalyst components thereof are added directly to the polymerization process and a suitable solvent or diluent, including condensed monomer, is used in said polymerization process. It is, however, preferred to form the active catalyst in a separate step in a suitable solvent prior to adding the same to the polymerization mixture.

The polymerization conditions for manufacturing the polymers of the present invention are generally those useful in the solution polymerization process, although the application of the present invention is not limited thereto. Gas phase polymerization processes are also believed to be useful, provided the proper catalysts and polymerization conditions are employed.

Fabricated articles made from the novel olefin polymers may be prepared using all of the conventional polyolefin processing techniques. Useful articles include films (e.g. cast blown and extrusion coated) fibers (e.g., staple fibers (including use of a novel olefin polymer disclosed herein as at least one component comprising at least a portion of the fiber's surface), spunbond fibers or melt blown fibers (using e.g., systems as disclosed in U.S. Pat. No. 4,340,563, U.S. Pat. No. 4,663,220, U.S. Pat. No. 4,668,566, or U.S. Pat. No. 4,322,027, all of which are incorporated herein by reference), and gel spun fibers (e.g., the system disclosed in U.S. Pat. No. 4,413,110, incorporated herein by reference)), both woven and nonwoven fabrics (e.g., spunlaced fabrics disclosed in U.S. Pat. No. 3,485,706, incorporated herein by reference) or structures made from such fibers (including, e.g., blends of these fibers with other fibers, e.g., PET or cotton) and molded articles (e.g., made using an injection molding process, a blow molding process or a rotomolding process). The new polymers described herein are also useful for wire and cable coating operations, as well as in sheet extrusion for vacuum forming operations.

Useful compositions are also suitably prepared comprising the substantially linear polymers of the present invention and at least one other natural or synthetic polymer. Preferred other polymers include thermo plastics such as styrene-butadiene block copolymers, polystyrene (including high impact polystyrene), ethylene vinyl alcohol copolymers, ethylene acrylic acid copolymers, other olefin copolymers (especially polyethylene copolymers) and homopolymers (e.g., those made using conventional heterogeneous catalysts). Examples include polymers made by the process of U.S. Pat. No. 4,076,698, incorporated herein by reference, other linear or substantially linear polymers of the present invention and mixtures thereof. Other substantially linear polymers of the present invention and conventional HDPE and/or LLDPE are preferred for use in the thermoplastic compositions.

Compositions comprising the olefin polymers can also be formed into fabricated articles such as those previously mentioned using conventional polyolefin processing techniques which are well known to those skilled in the art of polyolefin processing.

All procedures were performed under an inert atmosphere or nitrogen or argon. Solvent choices were often optional, for example, in most cases either pentane or 30–60 petroleum ether can be interchanged. Amines, silanes, lithium reagents, and Grignard reagents were purchased from Aldrich Chemical Company. Published methods for preparing tetramethylcyclopentadiene ($C_5Me_4H_2$) and lithium tetramethylcyclopentadienide ($Li(C_5Me_4H)$) include C. M. Fendrick et al. *Organometallics*, 3, 819 (1984). Lithiated substituted cyclopentadienyl compounds may be typically prepared from the corresponding cyclopentadiene and a lithium reagent such as n-butyl lithium. Titanium trichloride ($TiCl_3$) was purchased from Aldrich Chemical Company. The tetrahydrofuran adduct of titanium trichloride, $TiCl_3(THF)_3$, was prepared by refluxing $TiCl_3$ in THF overnight, cooling, and isolating the blue solid product, according to the procedure of L. E. Manzer, *Inorg. Syn*, 21, 135 (1982).

EXAMPLES 1–4

The metal complex solution for Example 1 is prepared as follows:

Part 1: Prep of $Li(C_5Me_4H)$

In the drybox, a 3L 3-necked flask was charged with 18.34 g of $C_5Me_4H_2$, 800 mL of pentane, and 500 mL of ether. The flask was topped with a reflux condenser a mechanical stirrer and a constant addition funnel container 63 mL of 2.5 M n-BuLi in hexane. The BuLi was added dropwise over several hours. A very thick precipitate formed: approx. 1000 mL of additional pentane had to be added over the course of the reaction to allow stirring to continue. After the addition was complete, the mixture was stirred overnight. The next day, the material was filtered, and the solid was thoroughly washed with pentane and then dried under reduced pressure. 14.89 g of $Li(C_5Me_4H)$ was obtained (78 percent).

Part 2: Prep of $C_5Me_4HSiMe_2Cl$

In the drybox 30.0 g of $Li(C_5Me_4H)$ was placed in a 500 mL Schlenk flask with 250 mL of THF and a large magnetic stir bar. A syringe was charged with 30 mL of $Me_2SiCl_2$ and the flask and syringe were removed from the drybox. On the Schlenk line under a flow of argon, the flask was cooled to −78° C., and the $Me_2SiCl_2$ added in one rapid addition. The reaction was allowed to slowly warm to room temperature and stirred overnight. The next morning the volatile materials were removed under reduced pressure, and the flask was taken into the drybox. The oily material was extracted with pentane, filtered, and the pentane was removed under reduced pressure to leave the $C_5Me_4HSiMe_2Cl$ as a clear yellow liquid (46.83 g; 92.9 percent).

Part 3: Prep of $C_5Me_4HSiMe_2NH^tBu$

In the drybox, a 3-necked 2 L flask was charged with 37.4 g of t-butylamine and 210 mL of THF. $C_5Me_4HSiMe_2Cl$ (25.47 g) was slowly dripped into the solution over 3–4 hours. The solution turned cloudy and yellow. The mixture was stirred overnight and the volatile materials removed under reduced pressure. The residue was extracted with diethyl ether, the solution was filtered, and the ether removed under reduced pressure to leave the $C_5Me_4HSiMe_2NH^tBu$ as a clear yellow liquid (26.96 g; 90.8 percent).

Part 4: Prep of $[MgCl]_2[Me_4C_5SiN^tBu](THF)_x$

In the drybox, 14.0 mL of 2.0 M isopropylmagnesium chloride in ether was syringed into a 250 mL flask. The ether was removed under reduced pressure to leave a colorless oil 50 mL of a 4:1 (by volume) toluene:THF mixture was added followed by 3.50 g of $Me_4HC_5SiMe_2NH^tBu$. The solution was heated to reflux After refluxing for 2 days, the solution was cooled and the volatile materials removed under reduced pressure. The white solid residue was slurried in pentane and filtered to leave a white powder, which was washed with pentane and dried under reduced pressure. The white powder was identified as $[MgCl]_2[Me_4C_5SiMe_2N^tBul](THF)_x$ (yield: 6.7 g).

Part 5: Prep of $(C_5Me_4(SiMe_2N^tBu))TiCl_2$

In the drybox, 0.50 g of $TiCl_3(THF)_3$ was suspended in 10 mL of THF. 0.69 g of solid $[MgCl]_2[Me_4C_5SiMe_2N^tBu](THF)_x$ was added, resulting in a color change from pale blue to deep purple. After 15 minutes, 0.35 g of AgCl was added to the solution. The color immediately began to lighten to a pale green-yellow. After 1½ hours, the THF was removed under reduced pressure to leave a yellow-green solid. Toluene (20 mL) was added, the solution was filtered, and the toluene was removed under reduced pressure to leave a yellow-green solid, 0.51 g (quantitative yield) identified by 1H NMR as $(C_5Me_4(SiMe_2N^tBu))TiCl_2$.

Part 6: Preparation of $[C_5Me_4(SiMe_2N^tBu)]TiMe_2$

In an inert atmosphere glove box, 9.031 g of $[C_5Me_4(Me_2SiN^tBu)TiCl_2$ is charged into a 250 ml flask and dissolved into 100 ml of THF. This solution is cooled to about −25° C. by placement in the glove box freezer for 15 minutes. To the cooled solution is added 35 ml of a 1.4 M MeMgBr solution in toluene/THF (75/25). The reaction mixture is stirred for 20 to 25 minutes followed by removal of the solvent under vacuum. The resulting solid is dried under vacuum for several hours. The product is extracted with pentane (4×50 ml) and filtered. The filtrate is combined and the pentane removed under vacuum giving the catalyst as a straw yellow solid.

The metal complex, $(C_5Me_4(SiMe_2N^tBu)]TiMe_2$, solution for Examples 2 and 3 is prepared as follows:

In an inert atmosphere glove box 10.6769 g of a tetrahydrofuran adduct of titanium trichloride, $TiCl_3(THF)_3$, is loaded into a 1 l flask and slurried into~300 ml of THF. To this slurry, at room temperature, is added 17.402 g of $[MgCl]_2$ $(N^tBuSiMe_2C_5Me_4)$ $(THF)_x$ as a solid. An additional 200 ml of THF is used to help wash this solid into the reaction flask. This addition resulted in an immediate reaction giving a deep purple solution. After stirring for 5 minutes 9.23 ml of a 1.56 M solution of $CH_2Cl_2$ in THF is added giving a quick color change to dark yellow. This stage of the reaction is allowed to stir for about 20 to 30 minutes. Next, 61.8 m l of a 1.4 M MeMgBr solution in toluene/THF (75/25) is added via syringe. After about 20 to 30 minutes stirring time the solvent is removed under vacuum and the solid dried. The product is extracted with pentane (8×50 ml) and filtered. The filtrate is, combined and the pentane removed under vacuum giving the metal complexe as a tan solid.

The metal complex, $[C_5Me_4(SiMe_2N^tBu)]TiMe_2$, solution for Example 4 is prepared as follows:

In an inert atmosphere glove box 4.8108 g of $TiCl_3(thf)_3$ is placed in a 500 ml flask and slurried into 130 ml of THF. In a separate flask 8.000 g of $[MgCl]_2(N^tBuSiMe_2C_5Me_4](THF)_x$ is dissolved into 150 ml of THF. These flasks are removed from the glove box and attached to a vacuum line and the contents cooled to −30° C. The THF solution of $(MgCl]_2[N^tBuSiMe_2C_5Me_4](THF)_x$ is transferred (over a 15 minute period) via cannula to the flask containing the $TiCl_3(THF)_3$ slurry. This reaction is allowed to stir for 1.5 hours over which time the temperature warmed to 0° C. and the solution color turned deep purple. The reaction mixture is cooled back to −30° C. and 4.16 ml of a 1.56 M $CH_2Cl_2$ solution in THF is added. This stage of the reaction is stirred for an additional 1.5 hours and the temperature warmed to −10° C. Next, the reaction mixture is again cooled to −40° C. and 27.81 ml of a 1.4 M MeMgBr solution in toluene/THF (75/25) was added via syringe and the reaction is now allowed to warm slowly to room temperature over 3 hours. After this time the solvent is removed under vacuum and the solid dried. At this point the reaction flask is brought back into the glove box where the product is extracted with pentane (4×50 ml) and filtered. The filtrate is combined and the pentane removed under vacuum giving the catalyst as a tan solid. The metal complex is then dissolved into a mixture of $C_8$–$C_{10}$ saturated hydrocarbons (e.g., Isopar® E, made by Exxon) and ready for use in polymerization.

Polymerization

Figure 1:
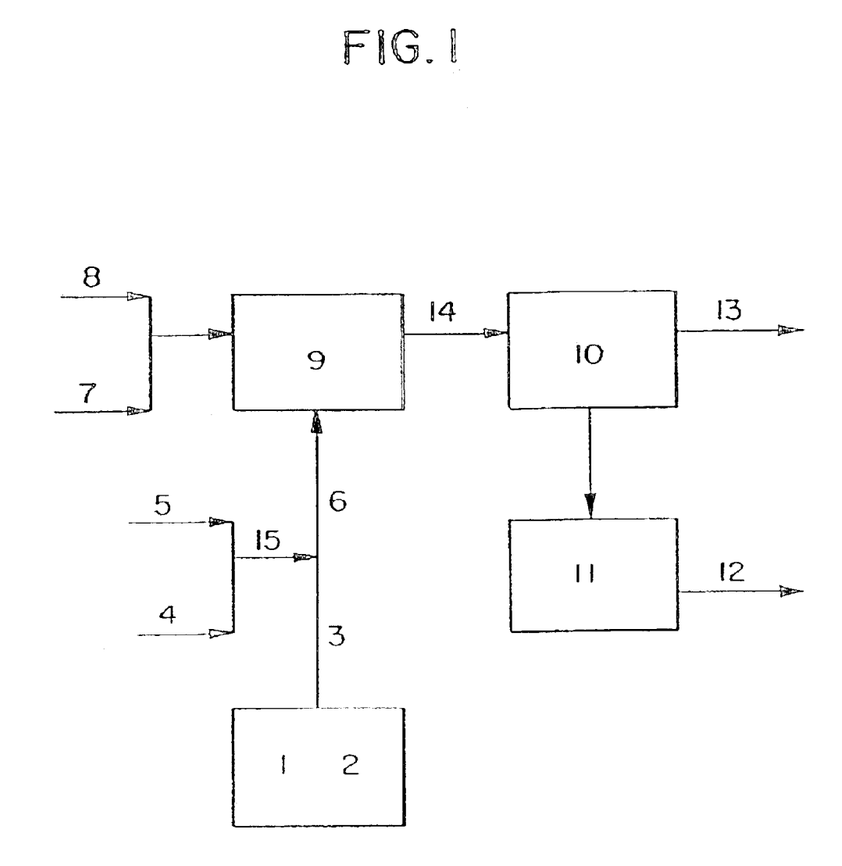
FIG. 1 is a schematic representation of a polymerization process suitable for making the polymers of the present inventions.

The polymer products of Examples 1–4 are produced in a solution polymerization process using a continuously stirred reactor. Additives (e.g., antioxidants, pigments, etc.) can be incorporated into the interpolymer products either during the pelletization step or after manufacture, with a subsequent re-extrusion. Examples 1–4 are each stabilized with 1250 ppm Calcium Stearate; 200 ppm Irgonox 1010, and 1600 ppm Irgafos 168. Irgafos™ 168 is a phosphite stabilizer and Irgonox™ 1010 is a hindered polyphenol stabilizer (e.g., tetrakis [methylene 3-(3,5-ditert.butyl-4-hydroxyphenylpropionate)]methane. Both are trademarks of and made by Ciba-Geigy Corporation. A representative schematic for the polymerization process is shown in FIG. 1.

The ethylene (4) and the hydrogen (5) are combined into one stream (15) before being introduced into the diluent mixture (3). Typically, the diluent mixture comprises a mixture of $C_8$–$C_{10}$ saturated hydrocarbons (1), (e.g., Isopar® E, made by Exxon) and the comonomer(s) (2). For examples 1–4, the comonomer is 1-octene. The reactor feed mixture (6) is continuously injected into the reactor (9). The metal complex (7) and the cocatalyst (8) (the cocatalyst is tris(pentafluorophenyl)borane for Examples 1–4 herein which forms the ionic catalyst insitu) are combined into a single stream and also continuously injected into the reactor. Sufficient residence time is allowed for the metal complex and cocatalyst to react to the desired extent for use in the polymerization reactions, at least about 10 seconds. For the polymerization reactors of Examples 1–4, the reactor pressure is held constant at about 490 psig. Ethylene content of the reactor, after reaching steady state, is maintained below about 8 percent.

After polymerization, the reactor exit stream (14) is introduced into a separator (10) where the molten polymer is separated from the unreacted comonomer(s), unreacted ethylene, unreacted hydrogen, and diluent mixture stream (13). The molten polymer is subsequently strand chopped or pelletized and, after being cooled in a water bath or pelletizer (11), the solid pellets are collected (12). Table 1describes the polymerization conditions and the resultant polymer properties:

TABLE I

| Example | 1 | 2 | 3 | 4 |
|---|---|---|---|---|
| Ethylene feed rate (lbs/hour) | 3.2 | 3.8 | 3.8 | 3.8 |
| Comonomer/Olefin* ratio (mole %) | 12.3 | 0 | 0 | 0 |
| Hydrogen/Ethylene ratio (mole %) | 0.054 | 0.072 | 0.083 | 0.019 |
| Diluent/Ethylene ratio (weight basis) | 9.5 | 7.4 | 8.7 | 8.7 |
| metal complex concentration (molar) | 0.00025 | 0.0005 | 0.001 | 0.001 |
| metal complex flow rate (ml/min) | 5.9 | 1.7 | 2.4 | 4.8 |
| cocatalyst concentration (molar) | 0.001 | 0.001 | 0.002 | 0.002 |
| cocatalyst flow rate (ml/min) | 2.9 | 1.3 | 6 | 11.9 |
| Reactor temperature (° C.) | 114 | 160 | 160 | 200 |
| Ethylene Conc. in the reactor exit stream (weight percent) | 2.65 | 3.59 | 0.86 | 1.98 |
| Product $I_2$ (g/10 minutes) | 1.22 | 0.96 | 1.18 | 0.25 |
| Product density (g/cc) | 0.903 | 0.954 | 0.954 | 0.953 |
| Product $I_{10}/I_2$ | 6.5 | 7.4 | 11.8 | 16.1 |
| Product $M_w/M_n$ | 1.86 | 1.95 | 2.09 | 2.07 |

*For Examples 1–4, the Comonomer/Olefin ratio is defined as the percentage molar ratio of ((1-octene/(1-octene + ethylene))

The $^{13}C$ NMR spectrum of Example 3 (ethylene homopolymer) shows peaks which can be assigned to the $\alpha\delta+$, $\beta\delta+$, and methine carbons associated with a long chain branch. Long chain branching is determined using the method of Randall described earlier in this disclosure, wherein he states that "Detection of these resonances in high-density polyethylenes where no 1-olefins were added during the polymerization should be strongly indicative of the presence of long chain branching." Using the equation 141 from Randall (p. 292):

Branches per 10,000 carbons=$[1/3a/T_{Tot}] \times 10^4 1$, wherein a=the average intensity of a carbon from a branch ($a\delta+$) carbon and $T_{Tot}$=the total carbon intensity, the number of long chain branches in this sample is determined to be 3.4 per 10,000 carbon atoms, or 0.34 long chain branches/1000 carbon atoms.

EXAMPLES 5, 6 AND COMPARATIVE EXAMPLES 7–9

Examples 5, 6 and comparison examples 7–9 with the same melt index are tested for rheology comparison. Examples 5 and 6 are the substantially linear polyethylenes produced by the constrained geometry catalyst technology, as described in Examples 1–4. Examples 5 and 6 are stabilized as Examples 1–4.

Comparison examples 7, 3 and 9 are conventional heterogeneous Ziegler polymerization blown film resins Dowlex® 2045A, Attane® 4201, and Attane® 4403, respectively, all of which are ethylene/1-octene copolymers made by The Dow Chemical Company. Comparative example 7 is stabilized with 200 ppm Irgonox® 1010, and 1600 ppm Irgafos® 168 while comparative examples 8 and 9 are stabilized with 200 ppm Irgonox® 1010 and 800 ppm PEPQ®. PEPQ® is a trademark of Sandoz Chemical, the primary ingredient of which is believed to be tetrakis-(2,4-di-tertbutyl-phenyl)-4,4' biphenylphosphonite.

A comparison of the physical properties of each example and comparative example is listed in Table II.

TABLE II

| Property | Example 5 | Example 6 | Comparison Example 7 | Comparison Example 8 | Comparison Example 9 |
|---|---|---|---|---|---|
| $I_2$ | 1 | 1 | 1 | 1 | 0.76 |
| density | .92 | .902 | .92 | .912 | .905 |
| $I_{10}/I_2$ | 9.45 | 7.61 | 7.8–8 | 8.2 | 8.7 |
| $M_w/M_n$ | 1.97 | 2.09 | 3.5–3.8 | 3.8 | 3.8–4.0 |

Surprisingly, even though the molecular weight distribution of Examples 5 and 6 is narrow (i.e., $M_w/M_n$ is low), the $I_{10}/I_2$ values are higher in comparison with comparative examples 7–9. A comparison of the relationship between $I_{10}/I_2$ vs. $M_w/M_n$ for some of the novel polymers described herein and conventional heterogeneous Ziegler polymers is given in FIG. 2. The $I_{10}/I_2$ value for the novel polymers of the present invention is essentially independent of the molecular weight distribution. $M_w/M_n$ which is not true for conventional Ziegler polymerized resins.

Figure 3:
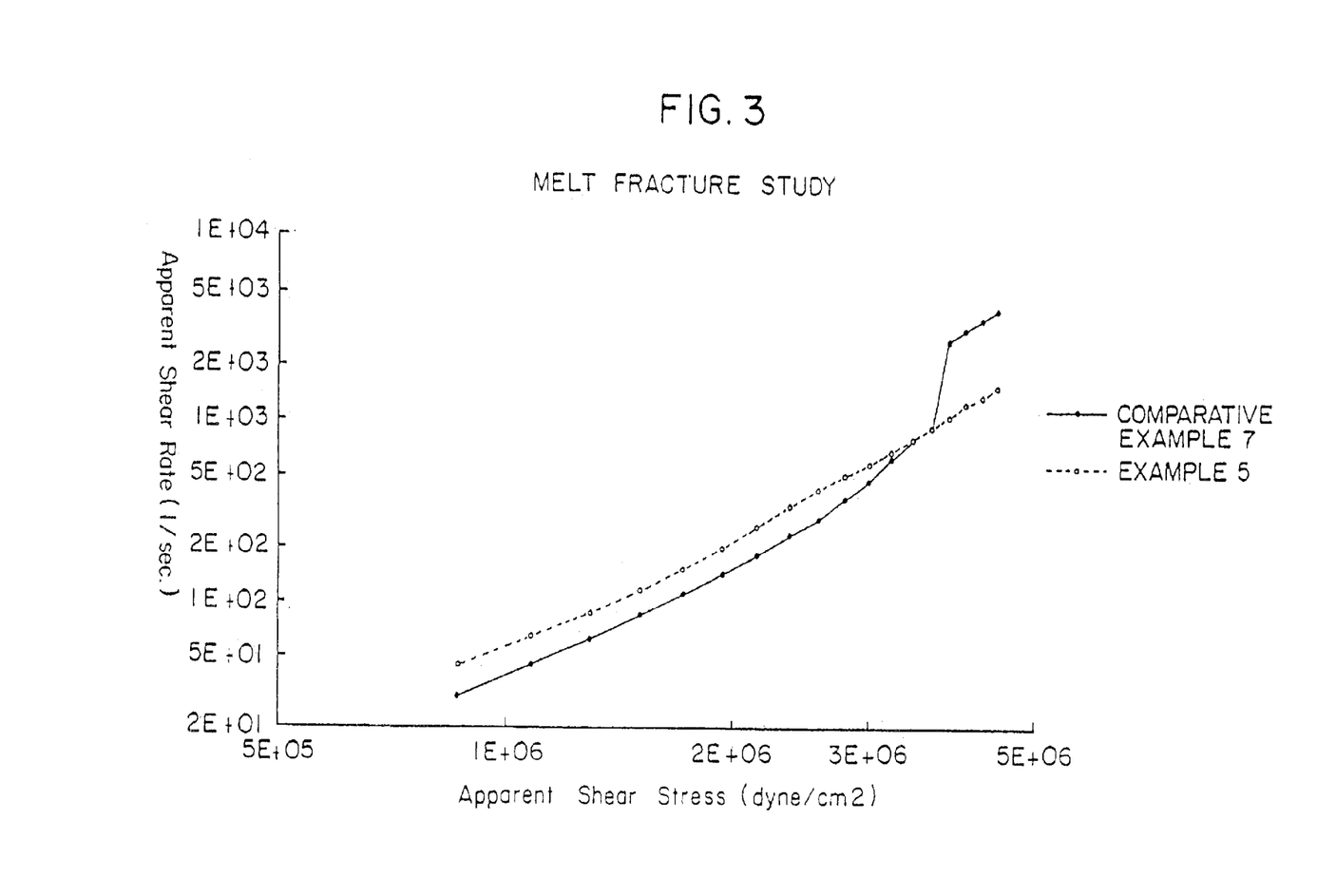
FIG. 3 plots the shear stress versus shear rate for Example 5 and comparative example 7, described herein.

Example 5 and comparison example 7 with similar melt index and density (Table II) are also extruded via a Gas Extrusion Rheometer (GER) at 190° C. using a 0.0296" diameter, 20 L/D die. The processing index (P.I.) is measured at an apparent shear stress of $2.15 \times 10^6$ dyne/cm² as described previously. The onset of gross melt fracture can easily be identified from the shear stress vs. shear rate plot shown in FIG. 3 where a sudden jump of shear rate occurs. A comparison of the shear stresses and corresponding shear rates before the onset of gross melt fracture is listed in Table III. It is particularly interesting that the PI of Example 5 is more than 20% lower than the PI of comparative example 7 and that the onset of melt fracture or sharkskin for Example 5 is also at a significantly higher shear stress and shear rate in comparison with the comparative example 7. Furthermore, the Melt Tension (MT) as well as Elastic Modulus of Example 5 are higher than that of comparative example 7.

TABLE III

| Property | Example 5 | Comparison example 7 |
|---|---|---|
| $I_2$ | 1 | 1 |
| $I_{10}/I_2$ | 9.45 | 7.8–8 |
| PI, kpoise | 11 | 15 |
| Melt Tension | 1.89 | 1.21 |
| Elastic Modulus @ .1 rad/sec. (dyne/cm²) | 2425 | 882.6 |

TABLE III-continued

| Property | Example 5 | Comparison example 7 |
|---|---|---|
| OGMF*, critical shear rate (1/sec) | >1556 (not observed) | 936 |
| OGMF*, critical shear stress (MPa) | .452 | .366 |
| OSMF**, critical shear rate (3/sec.) | >1566 (not observed) | ~628 |
| OSMF**, critical shear stress (MPa) | ~0.452 | ~0.25 |

*Onset of Gross Melt Fracture.
**Onset of Surface Melt Fracture.

Example 6 and comparison example 9 have similar melt index and density but example 6 has lower $I_{10}/I_2$ (Table IV). These polymers are extruded via a Gas Extrusion Rheometer (GEB) at 190° C. using a 0.0296 inch diameter, 20:1 L/D die. The processing index (PI) is measured at an apparent shear stress of $2.15 \times 10^6$ dyne/cm$^2$ as described previously.

TABLE IV

| Property | Example 6 | Comparison example 9 |
|---|---|---|
| $I_2$ (g/10 minutes) | 1 | 0.76 |
| $I_{10}/I_2$ | 7.61 | 8.7 |
| PI (kpoise) | 14 | 15 |
| Melt Tension (g) | 1.46 | 1.39 |
| Elastic Modulus @ 0.1 rad/sec (dyne/cm2) | 1481 | 1921 |
| OGMF*, critical shear rate (1/sec) | 1186 | 652 |
| OGMF*, critical shear stress (MPa) | 0.431 | 0.323 |
| OSMF**, critical shear rate (1/sec.) | ~764 | ~402 |
| OSMF**, critical shear stress (MPa) | 0.366 | 0.280 |

*Onset of Gross Melt Fracture.
**Onset of Surface Melt Fracture.

Figure 4:
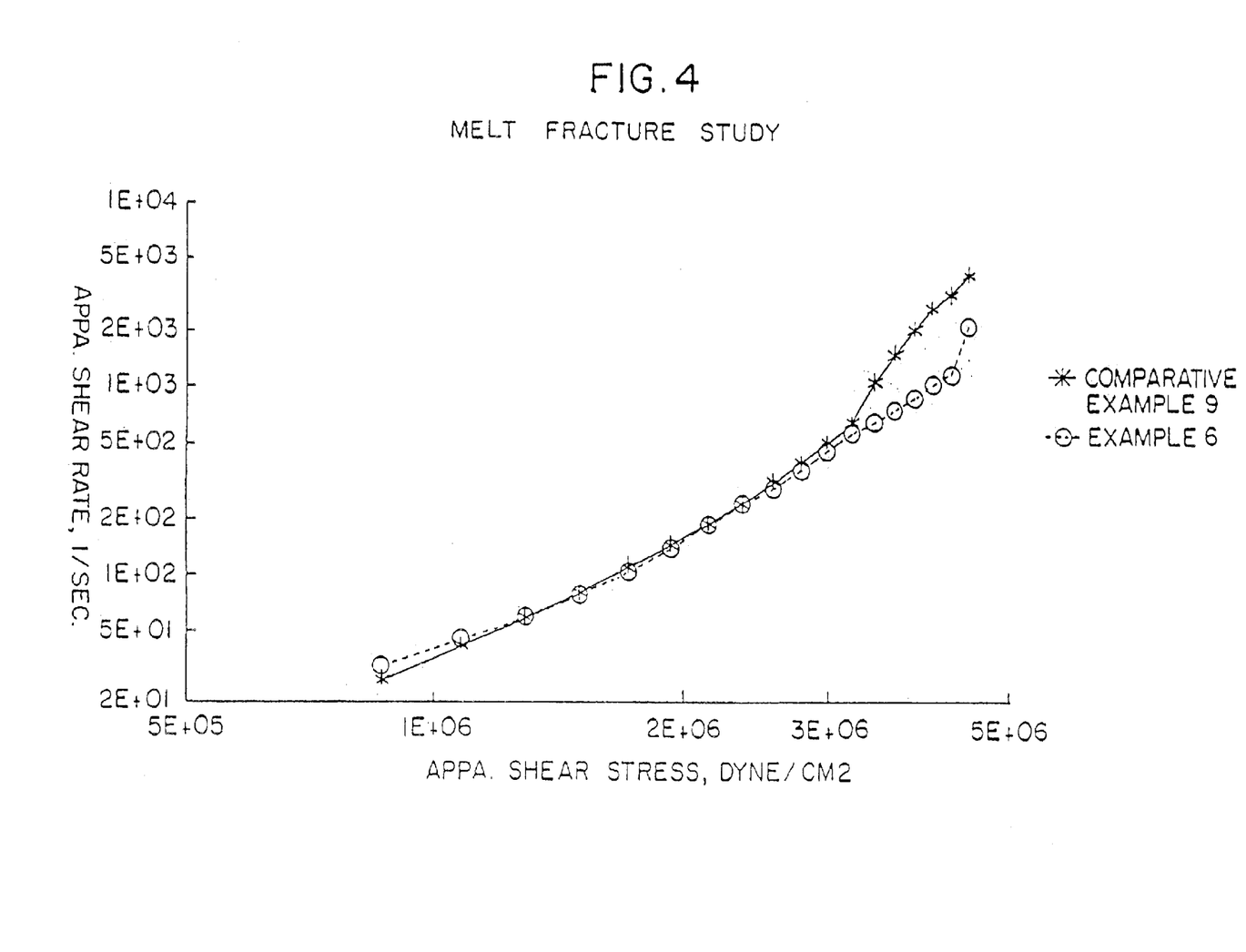
FIG. 4 plots the shear stress versus shear rate for Example 6 and comparative example 9, described herein.

The onset of gross melt fracture can easily be identified from the shear stress vs. shear rate plot shown in FIG. 4 where a sudden increase of shear rate occurs at an apparent shear stress of about $3.23 \times 10^6$ dyne/cm$^2$ (0.323 MPa). A comparison of the shear stresses and corresponding shear rates before the onset of gross melt fracture is listed in Table IV. The PI of Example 6 is surprisingly about the same as comparative example 9, even though the $I_{10}/I_2$ is lower for Example 6. The onset of melt fracture or sharkskin for Example 6 is also at a significantly higher shear stress and shear rate in comparison with the comparative example 9. Furthermore, it is also unexpected that the Melt Tension (MT) of Example 6 is higher than that of comparative example 9, even though the melt index for Example 6 is slightly higher and the $I_{10}/I_2$ is slightly lower than that of comparative example 9.

EXAMPLE 10 AND COMPARATIVE EXAMPLE 11

Blown film is fabricated from two novel ethylene/1-octene polymers made in accordance with the present invention and from two comparative conventional polymers made according to conventional Ziegler catalysis. The blown films are tested for physical properties, including heat seal strength versus heat seal temperature (shown in FIG. 5 for Examples 10 and 12 and comparative examples 11 and 13) machine (MD) and cross direction (CD) properties (e.g., tensile yield and break, elongation at break and Young's modulus). Other film properties such as dart, puncture, tear, clarity, haze, 20 degree gloss and block are also tested.

Blown Film Fabrication Conditions

The improved processing substantially linear polymers of the present invention produced via the procedure described earlier, as well as two comparative resins are fabricated on an Egan blown film line using the following fabrication conditions:

2 inch extruder 3 inch die 30 mil die gap

25 RPM extruder speed

460° F. melt temperature 1 mil gauge 2.7:1 Blow up ratio (12.5 inches layflat)

12. 5 inches frost line height

The melt temperature is kept constant by changing the extruder temperature profile. Frost line height is maintained at 12.5 inches by adjusting the air flow. The extruder output rate, back pressure and power consumption in amps are monitored throughout the experiment. The polymers of the present invention and the comparative polymers are all ethylene/1-octene copolymers. Table VI summarizes physical properties of the two polymers of the invention and for the two comparative polymers:

TABLE VI

| Property | Example 10 | Comparative example 11 | Example 12 | Comparatve example 13 |
|---|---|---|---|---|
| $I_2$ (g/10 minutes) | 1 | 1 | 1 | 0.8 |
| Density (g/cc) | 0.92 | 0.92 | 0.902 | 0.905 |
| $I_{10}/I_2$ | 9.45 | ~8 | 7.61 | 8.7 |
| $M_w/M_n$ | 2 | ~5 | 2 | ~5 |

Tables VII and VIII summarize the film properties measured for blown film made from two of these four polymers:

TABLE VII

| | Blown film properties | | | |
|---|---|---|---|---|
| | Example 10 | | Comparative example 11 | |
| Property | MD | CD | MD | CD |
| Tensile yield (psi) | 1391 | 1340 | 1509 | 1593 |
| Tensile break (psi) | 7194 | 5861 | 6698 | 6854 |
| elongation (percent) | 650 | 668 | 631 | 723 |
| Young's Modulus (psi) | 18990 | 19997 | 23086 | 23524 |
| PPT* Tear (gm) | 5.9 | 6.8 | 6.4 | 6.5 |

*Puncture Propagation Tear

TABLE VIII

| Property | Example 10 | Comparative example 11 |
|---|---|---|
| Dart A (gm) | 472 | 454 |
| Puncture (grams) | 235 | 275 |
| clarity (percent) | 71 | 68 |
| Haze | 3.1 | 6.4 |
| 20° gloss | 114 | 81 |
| Block (grams) | 148 | 134 |

During the blown film fabrication, it is noticed that at the same screw speed (25 rpm) and at the same temperature profile, the extruder back pressure is about 3500 psi at about 58 amps power consumption for comparative example 11 and about 2550 psi at about 48 amps power consumption for example 10, thus showing the novel polymer of example 10 to have improved processability over that of a conventional heterogeneous Ziegler polymerized polymer. The throughput is also higher for Example 10 than for comparative example 11 at the same screw speed. Thus, example 10 has higher pumping efficiency than comparative example 11 (i.e., more polymer goes through per turn of the screw).

Figure 5:
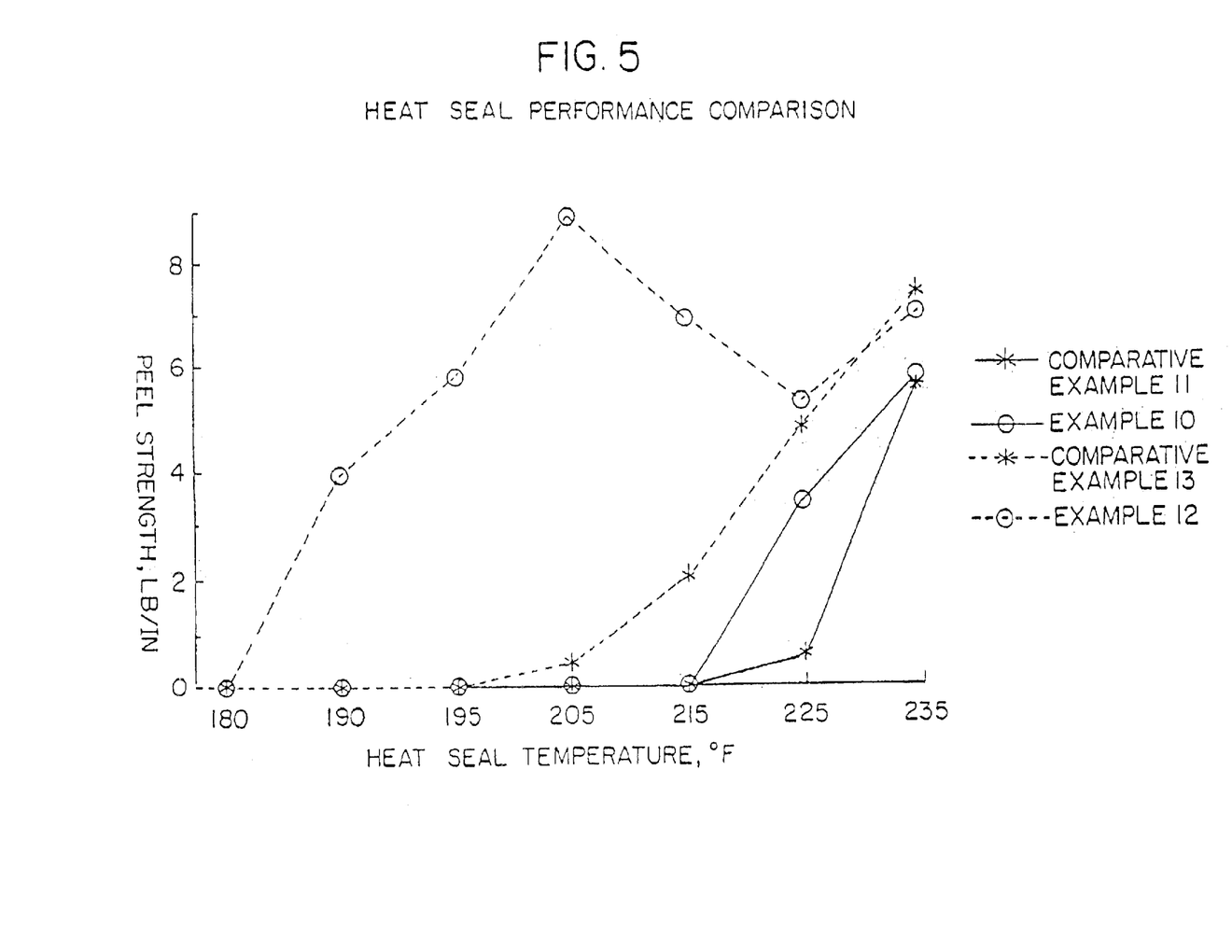
FIG. 5 plots the heat seal strength versus heat seal temperature of film made from Examples 10 and 12, and comparative examples 11 and 13, described herein.

As FIG. 5 shows, the heat seal properties of polymers of the present invention are improved, as evidenced by lower heat seal initiation temperatures and higher heat seal strengths at a given temperature, as compared with conventional heterogeneous polymers at about the same melt index and density.

What is claimed is:

1. An olefin homopolymer, the polymer having:
   A. a melt flow ratio, $I_{10}/I_2, \geq 5.63$,
   B. a molecular weight distribution, $M_w/M_n$, defined by the equation:

$$M_w/M_n \leq (I_{10}/I_2) - 4.63, \text{ and}$$

C. a critical shear stress at onset of gross melt fracture greater than about $4 \times 10^6$ dyne/cm$^2$.

2. An olefin homopolymer, the polymer having:
   A. a melt flow ratio, $I_{10}/I_2, \geq 5.63$, and
   B. a molecular weight distribution, $M_w/M_n$ of from about 1.5 to about 2.5.

3. An olefin homopolymer, the polymer having:
   A. from about 0.01 to about 3 long chain branches/1000 carbons, and
   B. a critical shear stress at onset of gross melt fracture of greater than about $4 \times 10^6$ dyne/cm$^2$.

* * * * *

UNITED STATES PATENT AND TRADEMARK OFFICE
CERTIFICATE OF CORRECTION

PATENT NO.    : 6,849,704 B2
DATED         : February 1, 2005
INVENTOR(S)   : Shih-Yaw Lai et al.

It is certified that error appears in the above-identified patent and that said Letters Patent is hereby corrected as shown below:

Title page,
Item [75], Inventors, delete "Pak-Wing Steve Chum, Lake Jackson, TX (US)".

Signed and Sealed this

Twenty-ninth Day of November, 2005

JON W. DUDAS
*Director of the United States Patent and Trademark Office*